(12) United States Patent
Palermo et al.

(10) Patent No.: US 10,614,466 B2
(45) Date of Patent: Apr. 7, 2020

(54) METHOD FOR MANAGING ON-LINE COMMERCIAL TRANSACTIONS

(75) Inventors: Michele Palermo, Turin (IT); Andrea Leggeri, Turin (IT)

(73) Assignee: Telecom Italia S.p.A., Milan (IT)

( * ) Notice: Subject to any disclaimer, the term of this patent is extended or adjusted under 35 U.S.C. 154(b) by 1116 days.

(21) Appl. No.: 12/982,525

(22) Filed: Dec. 30, 2010

(65) Prior Publication Data
US 2011/0289000 A1 Nov. 24, 2011

(30) Foreign Application Priority Data
Dec. 30, 2009 (IT) .............................. MI2009A2355

(51) Int. Cl.
G06Q 20/42 (2012.01)
G06Q 20/40 (2012.01)
(Continued)

(52) U.S. Cl.
CPC ............. G06Q 20/42 (2013.01); G06Q 20/12 (2013.01); G06Q 20/32 (2013.01);
(Continued)

(58) Field of Classification Search
CPC ....................................................... G06Q 20/42
See application file for complete search history.

(56) References Cited

U.S. PATENT DOCUMENTS 6,327,578 B1 * 12/2001 Linehan .......................... 705/65
RE39,736 E * 7/2007 Morrill, Jr. ...................... 705/44
(Continued)

FOREIGN PATENT DOCUMENTS

WO 2003/036575 A1 5/2003
WO 2008/047330 A2 4/2008
WO WO-2010072243 A1 * 7/2010 ............... G06F 8/60

OTHER PUBLICATIONS

ADC Telecommunications, "NewNet SMserver Wireless Short Message Service Tutorial," all pages. (Year: 1999).*
(Continued)

*Primary Examiner* — Jacob C. Coppola
(74) *Attorney, Agent, or Firm* — Banner & Witcoff, Ltd.

(57) ABSTRACT

Method for managing on-line commercial transactions between a user and a seller of goods/services that interact through respective data processing systems communicating through a data network. The method includes: upon receipt, from a computer system of an institute issuing payment cards, of a request of transaction with debit on the payment card of the user coming from the seller of goods/services, having the computer system of the institute issuing the payment cards preliminarily requesting a confirmation of the transaction to the buyer through a mobile telephony terminal of the buyer, and, in case the confirmation of the transaction is received, having the computer system of the institute issuing the payment cards processing the transaction, whereas in case the confirmation of the transaction is denied, not processing the transaction and informing the seller. Both or one of the request of confirmation of the transaction or the confirmation of the transaction are sent through communication over a data channel with the mobile telephony terminal of the buyer.

14 Claims, 3 Drawing Sheets

(51) Int. Cl.
*G06Q 20/32* (2012.01)
*G06Q 20/12* (2012.01)
*G06Q 30/06* (2012.01)

(52) U.S. Cl.
CPC ......... *G06Q 20/3255* (2013.01); *G06Q 20/40* (2013.01); *G06Q 30/06* (2013.01)

(56) References Cited

U.S. PATENT DOCUMENTS

| | | | |
|---|---|---|---|
| 7,600,676 B1 * | 10/2009 | Rados | G06Q 20/40 235/380 |
| 8,639,629 B1 * | 1/2014 | Hoffman | 705/67 |
| 8,909,553 B2 * | 12/2014 | Abifaker | G06Q 20/04 705/14.64 |
| 2002/0099656 A1 * | 7/2002 | Poh Wong | 705/40 |
| 2004/0176080 A1 * | 9/2004 | Chakravorty | G06Q 30/0621 455/414.1 |
| 2004/0219908 A1 * | 11/2004 | Ganor | H04W 88/184 455/422.1 |
| 2005/0215231 A1 | 9/2005 | Bauchot et al. | |
| 2006/0253335 A1 * | 11/2006 | Keena et al. | 705/26 |
| 2007/0174361 A1 * | 7/2007 | Branda et al. | 707/204 |
| 2007/0198432 A1 * | 8/2007 | Pitroda et al. | 705/64 |
| 2007/0288392 A1 * | 12/2007 | Peng et al. | 705/72 |
| 2008/0010215 A1 * | 1/2008 | Rackley, III | G06Q 20/042 705/70 |
| 2008/0033877 A1 * | 2/2008 | Blair et al. | 705/44 |
| 2008/0229098 A1 * | 9/2008 | Ishak | G06F 21/31 713/156 |
| 2008/0294556 A1 * | 11/2008 | Anderson | G06Q 20/40 705/44 |
| 2009/0037367 A1 * | 2/2009 | Wein | 707/2 |
| 2009/0063312 A1 * | 3/2009 | Hurst | 705/30 |
| 2009/0073965 A1 * | 3/2009 | Dowling et al. | 370/352 |
| 2009/0119190 A1 * | 5/2009 | Realini | 705/30 |
| 2009/0150248 A1 * | 6/2009 | Ling et al. | 705/17 |
| 2009/0164370 A1 * | 6/2009 | Sorbe et al. | 705/40 |
| 2010/0049654 A1 * | 2/2010 | Pilo | 705/43 |
| 2010/0125737 A1 * | 5/2010 | Kang | G06O 20/12 713/176 |
| 2010/0179906 A1 * | 7/2010 | Hawkes | G06Q 20/02 705/44 |
| 2010/0203870 A1 * | 8/2010 | Hubinak et al. | 455/414.1 |
| 2013/0018779 A1 * | 1/2013 | Laquerre | G06Q 40/02 705/39 |

OTHER PUBLICATIONS

Henry-Labordere et al., "SMS and MMS Interworking in Mobile Networks," Artech House, Inc., all pages. (Year: 2004).*
Italian Search Report dated Jul. 21, 2010, IT Appln. MI20092355.
Statement from the Notice from the EPO dated Oct. 1, 2007 concerning "business methods", OJ EPO Nov. 2007, 592-593, XP002456414, 1 page.

* cited by examiner (State of the Art)

METHOD FOR MANAGING ON-LINE COMMERCIAL TRANSACTIONS

CROSS REFERENCE TO RELATED APPLICATIONS

This application claims priority to Italian application no. MI2009A002355, filed Dec. 30, 2009, the entire contents of which are incorporated herein by reference.

The present invention relates generally to the field of telecommunications and in particular to the issues related to security in the so-called "electronic commerce" ("e-commerce") which, as known, uses the infrastructure of telecommunications networks, and in particular of the Internet.

The electronic commerce offers significant advantages and benefits to the consumers, for instance allowing them to perform transactions (e.g. purchase of goods and/or services) with sellers even remote, without geographic barriers, even in those cases where it would not be physical feasible for the consumers to go to the stores of the sellers themselves. Moreover, e-commerce reduces the costs incurred by the sellers, to which no setting up of stores located within the geographical territory is required, and this may reflect in cost savings also for the consumers.

Despite the undoubted benefits coming from the e-commerce, the latter has always struggled to take root in a widespread manner among consumers, inter alia for fear of computer frauds. Indeed, the most natural and immediate payment form of the goods/services purchased "on-line" by the consumer is through the use of credit cards: the consumer visits the Internet website of the seller, in which the respective goods/services are offered for sale; once selected the goods/services that he/she wishes to buy, the consumer, always on-line, issues a purchase order, and normally the seller asks the consumer to provide the data (typically the number, expiration date, the holder name, a security code) of his/her credit card. Once this information is received, the site of the seller contacts the computer system of the company issuing of the credit card for confirming the truthfulness of the information received from the buyer and finalizing the financial transaction. The computer system of the institution issuing the credit card checks the adequacy of the information that the buyer has provided, checks that the credit card is active (e.g., that is not blocked in consequence of a theft or loss complaint), possibly checks that the expenditure limit conferred to the buyer has not already been reached, and if all the checks have a positive result, it sends a confirmation of the transaction to the seller site, which is thus guaranteed that the fee for the ordered goods/services shall be allowed and provides the buyer with what he/she has ordered.

Such formula, while on one hand giving to the "honest" seller/vendor some assurance that the payment of the service will be paid regularly, on the other hand exposes the consumer to the well known fraud risks, typically identity frauds: for example, a third party could get the data of the credit card of the legitimate holder (he/she could even have "sniffed" them by monitoring communications between the data processor of the buyer and the computer system of the seller) and use them for making purchases which will then be debited on the account of the unaware legitimate owner.

Very numerous have been the proposals for making such transactions safer. In particular, some proposed solutions aim at avoiding that the consumer provides the data (typically the number) of his/her payment card (e.g., credit card or debit card) on-line. Also solutions supported by telephony networks were proposed, particularly by mobile telephony networks such as GSM or UMTS networks, and involving a confirmation request of the transaction sent to the buyer via the mobile phone of the latter.

The patent application WO 2008/047330 describes a financial transaction method comprising the steps of selecting a product or service for purchase; transmitting a transaction reference number to a financial institution over a wireless network; receiving a transaction confirmation requests from the financial institution over the wireless network and transmitting a confirmation message over the wireless network to the financial institution. The Applicant has observed that this method requires the buyer to purchase from a website, and to transmit through his/her mobile communication device via a USSD message, a reference code of the transaction. This operation may be complex for users and may lead to input errors.

The patent application U.S. 2005/0215231 describes a method for performing a commercial transaction wherein a customer having a computer connected to a public network (such as the Internet) and an SMS terminal is able to send and receive SMS messages on a telephone network and can order an article, through the computer, to a commercial server connected to the public network. The method involves: (1) the transmission of an SMS message from the commercial site to the customer through the mobile network—the SMS message comprises the address within the mobile network to a server of payment; (2) the sending to the payment server by the customer, after receiving the SMS text message on the SMS terminal, of a modified SMS message modified by adding at least the information that allows the identification of the payment means of the customer.

The patent application WO 03/036575 describes a universal payment activator using the mobile telephony network. The user can subsequently charge his/her purchase to the payment card. For this purpose the user must provide the telephone number for each purchase so that the operation can be approved in a processing centre. The processing centre telephones the user to request payment authorisation once the user has been identified with a secret code. The proposed solution in this patent application consists in using a payment card comprising the standard sixteen digits, of which the first six correspond to the BIN (Bank Identification Number) of the processing company, the next nine digits correspond to the user's mobile telephone number and the last digit corresponds to a check digit for the previous fifteen digits.

The Applicant has observed that in many cases the solutions significantly impact on the existing system architecture, comprising for example the existence of "certifier" entities with which the computer system of the consumer and/or of the vendor and/or of the company issuing credit cards have to interact, which forces time to time ones or the others to heavily modify the procedures previously enforced. All of this, in the Applicant opinion, is highly undesirable, to the point to deter the involved entities from implementing the new procedures, despite the increased security that would be granted.

In view of the state of the art outlined above, the Applicant has set the goal of finding a solution which would improve the security against frauds in the electronic commerce, being at the same time of easy and substantially immediate implementation.

Essentially, according to an aspect of the present invention a method for managing on-line commercial transactions between a user and a seller of goods/services that interact through respective data processing systems communicating through a data network is provided.

The method comprises:

upon receipt, from a computer system of an institute issuing the payment card, of a request of transaction with debit on the payment card of the user, coming from the seller of goods/services, having said computer system of the institute issuing the payment cards preliminarily requesting a confirmation of the transaction to the buyer through a mobile telephony terminal of the buyer, and, in case the confirmation of the transaction is received, having said computer system of the institute issuing the payment cards processing the transaction, whereas in case the confirmation of the transaction is denied, not processing the transaction and informing the seller. The request of confirmation of the transaction or the confirmation of the transaction or both is sent through communication over a data channel with the mobile telephony terminal of the buyer.

The user may communicate, through the respective data processing system and through the data network, to the data processing system of the seller information of a respective payment card or in alternative a number of the mobile telephony terminal.

Said having the computer system of the institute issuing the payment cards preliminarily requesting a confirmation of the transaction to the buyer may comprise:

having the computer system of the institute issuing the payment cards contacting a computer system of a manager of confirmations of transactions;

having the computer system of the manager of confirmations of transactions requesting the confirmation of the transaction to the buyer through the mobile telephony terminal of the buyer and, in case the confirmation of the transaction is received by the computer system of the manager of confirmations of transactions, having the latter communicating to the computer system of the institute issuing the payment cards the confirmation of the transaction, while in case the confirmation of the transaction is denied, having the computer system of the manager of confirmations of transactions communicating to the computer system of the institute issuing the payment cards a denial of the transaction.

The request of confirmation of the transaction or the confirmation of the transaction or both is sent through at least one among: an SMS message, the WAP protocol, the HTTP protocol, the HTTPS protocol.

According to another aspect of the present invention, a system of management of on-line commercial transactions between a user and a seller of goods/services that interact through respective computer systems communicating through a data network is provided. The system comprises a computer system of an institute issuing the payment cards in communication relationship with the computer system of the seller and configured to receive from the computer system of the seller requests of money transactions through the payment card of the user and to perform or deny the requested transactions based on checks made on the identifying data of the payment card of the user.

A computer system managing confirmations of the transactions, in communication relationship with the computer system of the institute issuing the payment cards is provided, being configured for:

receiving from the computer system of the institute issuing the payment cards requests for obtaining the confirmation of the money transactions requested by the computer system of the seller;

interacting with the user through a respective mobile telephony terminal to get from the user confirmations or denials of the transactions;

communicating to the computer system of the institute issuing the payment cards the confirmations or denials of the transactions obtained by the user, and in which the computer system of the institute issuing the payment cards is configured in such a way that, upon receipt of a request of money transaction from the computer system of the seller, it processes such money transaction only on condition of having preliminarily obtained the confirmation of the user. The request of confirmation of the transaction or the confirmation of the transaction or both is sent through communication through a data channel with the mobile telephony terminal of the buyer.

The user may communicate, through the respective data processing system and through the data network, to the data processing system of the seller information of a respective payment card or in alternative a number of the mobile telephony terminal.

The computer system of the institute issuing the payment cards is preferably configured for contacting a computer system of a manager of confirmations of transactions, and the computer system of the manager of confirmations of transactions is configured for requesting the confirmation of the transaction to the buyer through the mobile telephony terminal of the buyer, and, in case the confirmation of the transaction is received by the computer system of the manager of confirmations of transactions, communicating to the computer system of the institute issuing the payment cards the confirmation of the transaction, while, in case the confirmation of the transaction is denied, communicating to the computer system of the institute issuing the payment cards a denial of the transaction.

The request of confirmation of the transaction or the confirmation of the transaction or both is sent through at least one among: an SMS message, the WAP protocol, the HTTP protocol, the HTTPS protocol.

These and other features and advantages of the present invention will become more apparent from the following detailed description of possible practical embodiments thereof, and of some possible variations, description which however is provided purely by way of not-limiting example, and which will be conducted by reference to the attached drawings wherein.

Figure 3:
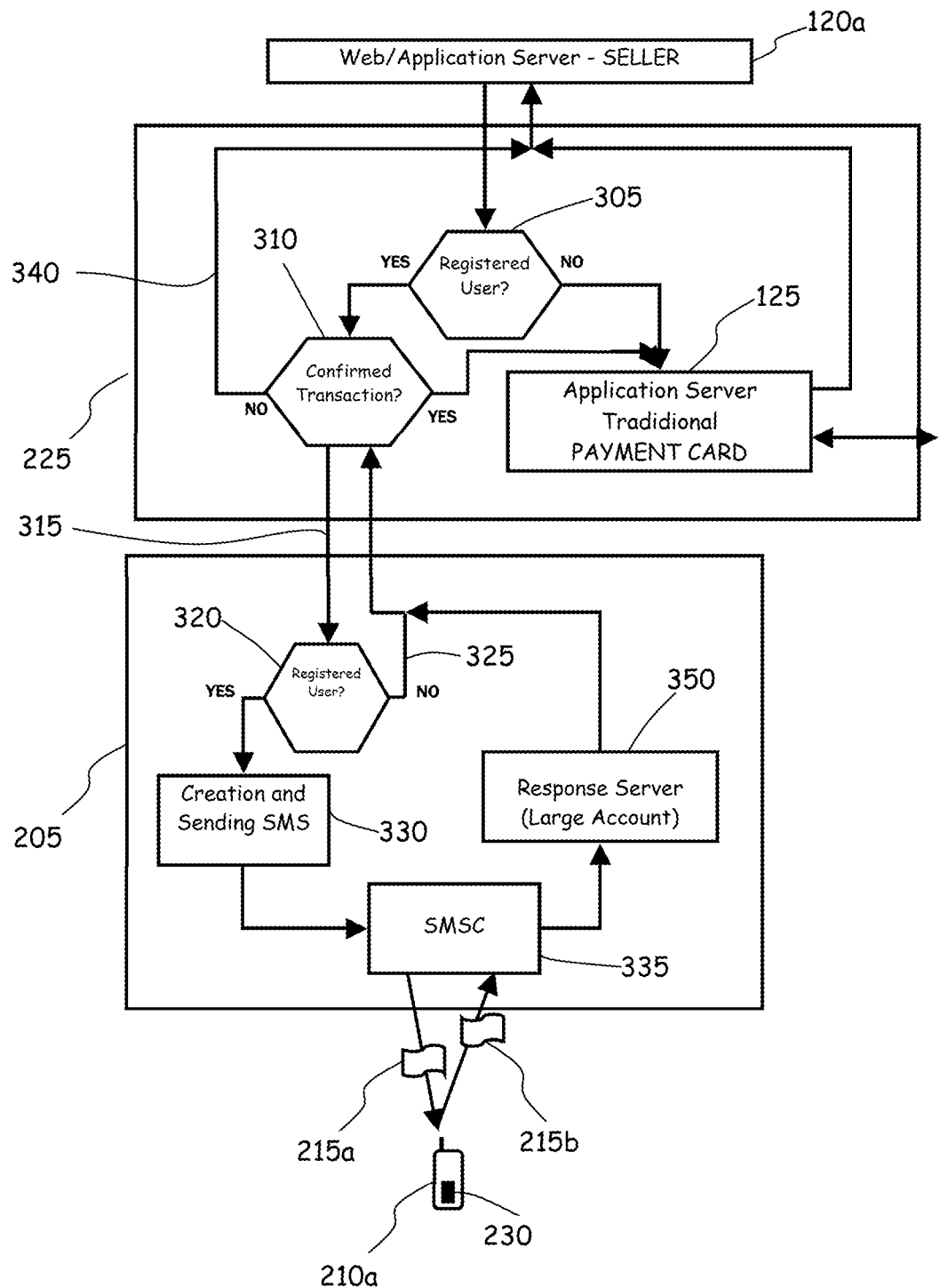

FIG. 3 exemplifies the main actions performed by a server system of an institute issuing the payment cards and by a server management system of operations related to obtaining of a confirmation of the transaction from the buyer, according to an embodiment of the present invention.

Figure 1:
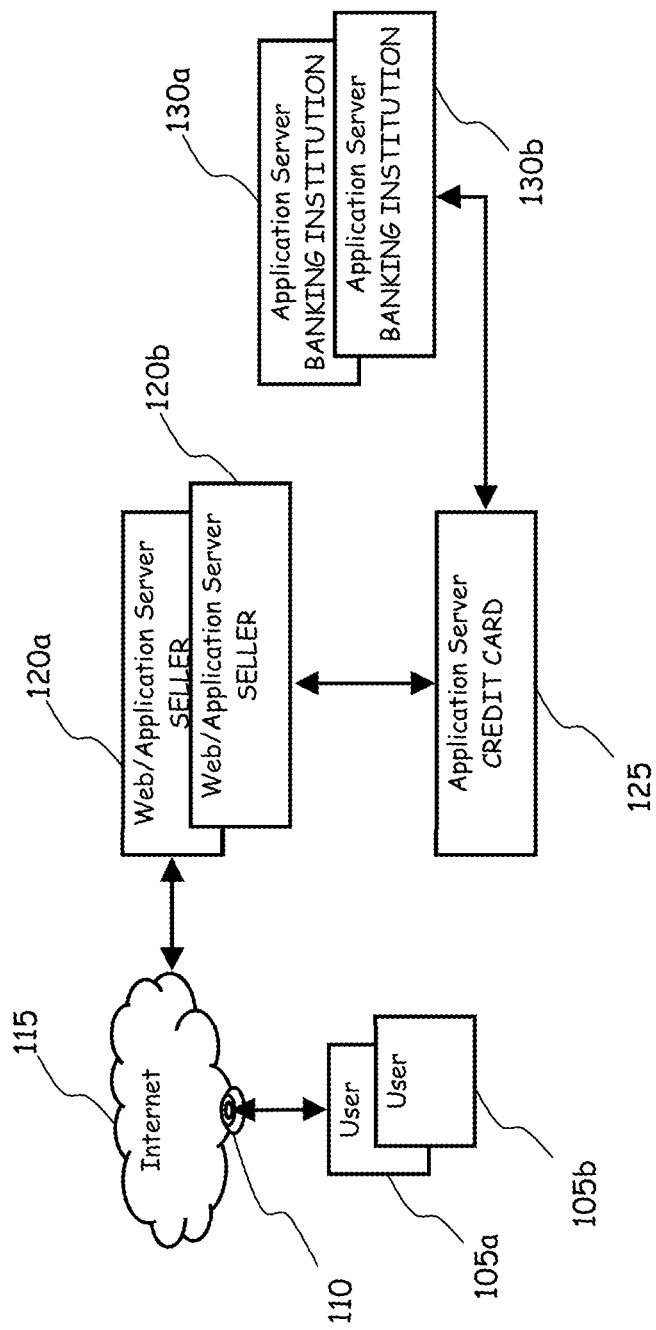
FIG. 1 shows schematically the traditional architectural context in which electronic commerce transactions are performed.

With reference to the drawings, in FIG. 1 a classic architectural context in which electronic commerce transactions are performed, particularly by credit payment card, is schematically shown.

Users 105a, 105b, . . . , equipped with respective data processors, such as Personal Computers (PC) or smartphones or a cellular phone, have access to the Internet 115 through respective access points 110. The Internet connection may be established via the fixed telephony network and/or mobile telephony network and/or WiFi "hot spots".

The users 105a, 105b, . . . access Internet sites of entities selling goods and/or services, such sites being typically hosted on server systems (Web servers or Application servers) 120a, 120b, . . . connected to the Internet. On such seller sites, the users may browse goods/services catalogues offered on-line, select the goods/services of interest, and perform purchases of the selected goods/services, filling in, always on-line, appropriate purchase orders, according to the manner prescribed by the specific seller. Normally, when the user performs a purchase, he/she is asked to specify a payment form, and the most natural and immediate payment form is by credit card (often this may be the only form accepted by the seller, or it may be the payment form which, among the other possibilities, allows the user to obtain price discounts or rebates on the cost of delivery of the purchased product). For performing credit payment card, the user has to provide to the seller the credit card data, typically the credit card number, the card holder name, the card expiry date, possibly a security identification code of the card; all of these data are communicated on-line to the seller, by filling in the appropriate virtual forms.

Once the purchase order and the buyer's credit card information are received, the server system 120a, 120b, . . . that hosts the Internet website of the seller contacts via the Internet or via a connection of another type, for example telephonically, a server system 125 of the institution issuing the credit card. The server system 125 of the institute issuing the credit card checks the adequacy of the data entered by the buyer and communicated by the seller server system, checks that the credit card is active (e.g., ensuring it has not been blocked as a result of a loss or theft complaint), and checks that the monthly expenditure limit allowed to the buyer has not been exceeded and, if all the checks are positive, the server system 125 of the institute issuing the credit card communicates the success of the transaction to the server system 120a, 120b, . . . hosting the seller Internet website, and also announced (in the time provided by the issuing contract of the credit cards, for example at the end of the calendar month) to the credit/banking institution (e.g. a server system 130a, 130b, . . . of the banking institution) where the buyer has backed the credit card the charging of the amount of the transaction on the current account of the buyer. The seller, upon receiving by the institution issuing the credit card the confirmation of the successful completion of the transaction, and thus having guarantee that the payment will be regularly provided, provides for the required service (e.g., sending him/her, the purchased product(s), by mail or otherwise, even according to the nature of the goods).

This system exposes the buyer and the seller to the above discussed risks.

Figure 2:
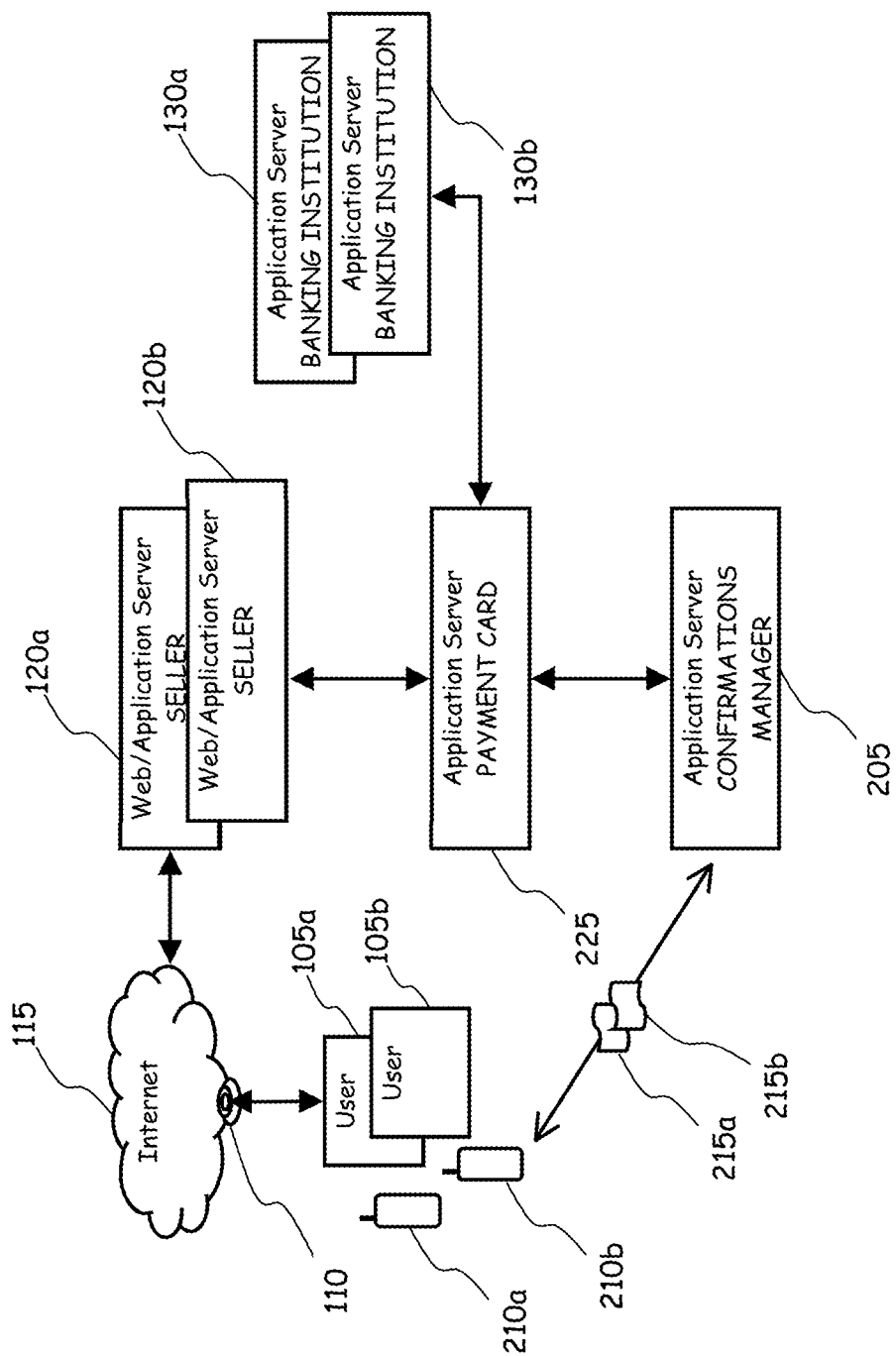
FIG. 2 shows, again schematically, a solution according to one embodiment of the present invention.

FIG. 2 shows schematically a solution according to one embodiment of the present invention, able to increase security in electronic commerce transactions.

According to an embodiment of the present invention, the server system 225 of the institution issuing the payment card (e.g., credit or debit card) of the buyer is configured to interact not only with the server system 120a, 120b, . . . hosting the Internet website of the seller and the server system 130a, 130b . . . of the financial/banking institution with which the customer has backed his/her payment card, but also with a server system 205 of an entity in charge of managing the operations of the transaction confirmed by the buyers themselves. The server system 205, for managing the transaction confirmation operations, interacts with the systems of a mobile telephony network operator (real or virtual), or the server system 205 may be directly managed by a mobile telephony network operator (real or virtual), for allowing to contact the buyer through his/her mobile telephone 210a, 210b, . . . (which could be the same terminal through which the users 105a, 105b, . . . are connected via the Internet 115 to the sellers sites 120a, 120b, . . . ). The confirmation of the transaction by the user 105a, 105b, . . . occurs, for example, by exchange of SMS or MMS messages 215a, 215b between the server system of confirmation of transactions 205 and the mobile telephones 210a, 210b, . . . of the users 105a, 105b, . . . as described in further detail in the following.

The generic user 105a, 105b, . . . which desires to use the service of confirmation of the on-line transactions with payment card has to firstly register with the provider of that service and subscribe to the same service. The subscription to the service may be performed in any way, for example through a Web site of the manager of the operations of confirmation of transactions or of the manager of the mobile telephony network. The subscription to the service may result in the issuance to the user that subscribes thereto of a new SIM (Subscriber Identity Module), storing a dedicated software package (e.g., an SIM Application Toolkit software package), which may be executed by the mobile telephone of the user, for managing operations related to the confirmation of the transactions (as described in detail below), or, upon subscription to the service, and if the SIM card allows it, the user may receive the software package to be installed on the SIM card from a platform of the manager of the operations of confirmation of transactions or of the manager of the mobile telephony network, by means of SMS messages (as in the case of the "InteracTIM" platform by Telecom Italia), or even, in the case which the user owns a mobile telephone (typically a smart-phone) having an "open" operating system (such as for example Symbian, Windows Mobile, iPhone, BlackBerry), the software package may be downloaded from a Web site of the manager of the operations of confirmation of transactions or of the manager of a mobile telephony network, through WAP (Web Application Protocol).

Once the generic user has subscribed to the service, a corresponding user profile is created at the server system 205 of the manager of the operations of confirmation of transactions. The user profile comprises in particular the personal details of the user and the mobile telephone number. The manager of the service of confirmation of transactions also communicates the occurred registration of the user to the respective institution issuing the credit card owned by the user.

With reference to FIG. 3, let it be assumed that the user 105a desires to make a purchase of goods/services offered for on-line sale by a seller through the server system 120a. As usual, the user 105a accesses, through his/her own PC or smart-phone or mobile telephone, the Internet website of the seller hosted on the server system 120a selects the good(s)/service(s) of interest, and on-line fills out the purchase order, specifying as payment form the one by payment card. Upon request of the seller, the user provides to the same, always on-line, the data of his/her payment card, typically the card number, card holder name, the card expiry date, possibly a security identification code of the card.

Once the purchase order and the payment card data of the buyer 105a are received, the server system 120a hosting the Internet website of the seller contacts the server system 225 of the institute issuing the payment card of the buyer 105a and provides thereto the data entered by the buyer 105a. All of these operations are performed as usual.

The server system 225 of the institute issuing the payment card firstly checks whether the buyer 105a is registered to the service of confirmation of on-line transactions (block 305). Such check is performed on the basis of data such as credit card numbers and the card holder name provided by the buyer 105a received by the server system 120a of the seller; for performing such check, the server system 225 may for example exploit the usual database of users holding payment cards, integrated with information about whether the generic holder of payment card is also registered to the service of confirmation of transactions.

If the buyer 105 is not registered to the service of confirmation of transactions (exit branch NO of the block 305), the operations performed by the server system 225 are the traditional ones (the traditional server system 125 of the institution issuing the payment card checks for the truthfulness of the data entered by the buyer, checks that the payment card is active—for instance, checks if has not been blocked following a loss or theft complaint—, and checks that the monthly expenditure limit is not exceeded; if all these checks are positive, the traditional server system 125 of the institution issuing the payment card of the buyer communicates the success of the transaction to the server system 120a, 120b, . . . hosting the Internet website of the seller, and also communicates to the server system 130a, 130b of the financial/banking institution with which the customer has backed his/her payment card the debiting of the amount of the transaction on the current account of the buyer. The seller, once the confirmation of the successful completion of the transaction is received from the institution issuing the payment card, provides the service required to the buyer).

If, conversely, the 105a user has subscribed to the service of confirmation of transactions (exit branch YES of the block 305), the server system 225 of the institute issuing the payment card of the buyer 105a starts a request for obtainment of a confirmation of the transaction by the buyer 105a procedure (block 310). Such procedure involves the server system 225 of the institute issuing the payment card contacting 315 the server system 205 of the manager of the service of confirmation of transactions, by providing it with the personal details of the buyer. The server system 205 of the manager of the service of confirmation of transactions firstly checks that the user 105a is effectively registered to the service of confirmation of transactions (block 320); for this purpose, a search in the database of registered user profiles is performed, using as a search key the personal details of the buyer.

If the user 105a is not registered to the service (exit branch NO of block 320), the server system 205 of the manager of confirmation of transaction communicates 325 this to the server system 225 of the institution issuing the payment card. The user may result not registered to the service of confirmation of transactions—from the point of view of the server system 205 of the manager of the service of confirmation of transactions—since at that moment he/she does not have his/her telephones turned on or it is out of coverage. For example, the communication 325 given to the server system 225 of the institution issuing the payment card corresponds to a notification of "unconfirmed transaction by the buyer."

If, conversely, the user 105a results to be registered to the service (output branch YES of block 320), a request of confirmation of the transaction is sent to the mobile telephone 210a of the user 105a. For this purpose, an SMS with proper format is created (block 330), and, through an SMS service centre (SMSC or SMS Centre) 335 of the mobile telephony operator to which the user 105a is subscribed, the SMS 215a is sent to the mobile telephone 210a of the user 105a. The SMSC 335, although depicted as part of the server system 205 of the manager of the service of confirmation of transactions, is not necessarily such, this being in particular the case when the manager of the service of confirmation of transactions is not an operator of mobile telephony network.

In particular, the SMS 215a which is sent to the mobile telephone of the user 105a may be an SMS containing data and which, once received by the mobile telephone 210a, activates the software package installed on the mobile telephone 210a or on the SIM card inserted therein. The SMS 215a, which will also comprise the details of the transaction of which confirmation is required (e.g., the money amount of the transaction, an identification code of the transaction or an identifier of the seller), may be encrypted, such as with 3DES encryption, to ensure data confidentiality.

Upon receiving the SMS 215a, the software package residing on the mobile telephone 210a of the user 105a interprets the message (if the message is encrypted, firstly decrypts it), and requests to the user 105a a confirmation of the transaction, for example through a "pop-up" window that is displayed on the screen of the mobile telephone 210a, in which for example the details of the transaction are contained, and which invites the user 105a to confirm or not the transaction itself. To confirm or deny the transaction, the user may use the mobile telephone keypad 210a, possibly "virtual" keys ("soft-keys") "YES" and "NO" if the telephone 210a is of "touch screen" type.

For example, the user 105a, verified the correspondence between details about the transaction the confirmation of which is being requested and the data of the transaction that he/she intends to make, may confirm the transaction. Conversely, if the user 105a receives a confirmation of a transaction that he/she never intended to do (which may for example occurs in case a third entity, fraudulently holding payment card data of the user 105a, or even the same credit card, tries to use them to perform transactions without the consent of the legitimate holder), the user 105a may not confirm the transaction.

The software package residing on the mobile telephone 210a "captures" the choice made by the user 105a, and fills in a return SMS, which also may be encrypted as the forward SMS 215a to ensure the data confidentiality. The return SMS 215b is then sent from the mobile telephone 210a to the system 205 of the manager of the service of confirmation of transactions, in particular, to a responses management server 350; advantageously, the responses management server may be associated with a so-called "Large Account", i.e. with a short telephone number associated with, by the manager of mobile telephony network, the service of confirmation of transactions.

The responses management server 350 receives the response message, decrypts it if necessary and then interprets it to determine whether the user 105a has confirmed or not the related on-line transaction.

The response of the user 105a is passed to the server system 225 of the institute issuing the payment card of the buyer 105a (block 310), which is then able to determine whether the buyer 105a has confirmed or not the transaction. In the negative case (exit branch NO of the block 310), the server system 225 of the institute issuing the payment card of the buyer 105a communicates 340 to the server system 120a hosting the web site of the seller that the requested transaction has not been confirmed by the buyer 105a. The notification to the server system 120a hosting the Internet website of the seller may for example be a general notification of transaction denial, or it may specify that the transaction has been denied due to lack of confirmation by the buyer 105*a* holder of the payment card. The same communication of un-confirmation of the transaction is for example given in the case the system 205 of the manager of the service of confirmation of transactions determines that the user 105*a* is not registered to the service. If instead the user 105*a* has confirmed the transaction (output branch YES of the block 310), the server system 225 of the institute issuing the payment card of the buyer 105*a* performs the following operations: the traditional server system 125 of the institution issuing the payment card checks the adequacy of the data entered by the buyer, checks that the payment card is active—e.g., checks if it has not been blocked following a loss or theft complaint—, checks that the monthly expenditure limit has not been exceeded; if all these checks are positive, the traditional server system 125 of the institution issuing the payment card of the buyer communicates the success of the transaction to the server system 120*a*, 120*b*, . . . hosting the Internet website of the seller, and also communicates to the server system 130*a*, 130*b* of the financial/banking institution with which the customer has backed his/her payment card the debited transaction amount on the current account of the buyer. The seller, received by the institution issuing the payment card the confirmation of the successful completion of the transaction, provides the required service to the buyer.

There are several possible alternatives to the embodiment described above. For example, instead of by SMS, the confirmation request of the transaction, and/or the subsequent response by the buyer 105*a*, may be performed through a different communication data channel between the mobile telephone 210*a* of the buyer 105*a* and the server system 205 of the manager of the service of confirmation of transactions, for example using WAP (Wireless Application Protocol), HTTP (Hyper Text Transfer Protocol) or HTTPS (Hyper Text Transfer Protocol over Secure Socket Layer). For example, the server system 205 of the manager of the service of confirmation of transactions may send to the mobile telephone 210*a* of the buyer 105*a* a WAP-Push which determines the opening of the client browser residing on the mobile telephone 210*a* on a page corresponding to a specific URL (Universal Resource Locator) which corresponds to the responses management server 350; the user 105*a* then may, by interacting with the browser running on his/her mobile telephone 210*a*, directly enter the desired response ("YES": confirmation of the transaction—"NO": unconfirmed transaction).

As should be appreciated from the detailed description given above, the implementation of the solution according to the present invention is completely transparent for the (server system hosting the Internet website of the) seller, which interacts in a completely traditional way with the server system of the institute issuing the payment cards. This is a significant advantage because the implementation of the solution according to the present invention does not force on-line sellers to change their systems.

Also from the point of view of the institutions issuing the payment cards, the implementation of the solution according to the present invention has a minimal impact, since it involves the addition of minimum functionality upstream of the functionality already traditionally implemented.

Thanks to all this, the Applicant believes that the solution according to the present invention, which introduces a high degree of security in e-commerce transactions, will be accepted without resistance and with favour by the various entities involved in this kind of transactions.

In an alternative embodiment of the present invention, in order to ensure even greater security for the users, when a user wants to make a purchase of goods/services offered for sale by a seller through an Internet website (hosted on the server system 120*a*, 120*b*, . . . ), the user himself/herself may be asked if he/she is registered to the service of confirmation of transactions, in which case, instead of inserting the payment card details, the user may only enter his/her mobile telephone number (the number which is registered to the system 205 of the manager of confirmation of transactions). The server system 120*a*, 120*b*, . . . of the seller in this case will communicate to the server system 225 of the institution issuing the payment card of the buyer the mobile telephone number of the buyer, and such mobile telephone number will be communicated to the system 205 of the manager of confirmation of transaction. The latter, having verified that the mobile telephone number entered by the buyer corresponds to a user registered to the service of confirmation of transactions, will perform the same operations as described above.

This embodiment, with respect to that above described, has the further advantage that the user has not to enter the sensitive data of his/her payment card, thereby avoiding the risk that such data are illegally "sniffed".

The present invention has been herein described with reference to some of its possible practical embodiments, which have to be construed as merely illustrative and not restrictive. The ones skilled in the art will be able, based on the teachings herein provided, to devise different embodiments, or variations to the embodiments described, without parting from the scope of the invention defined in the following claims.

The invention claimed is:

1. A method comprising:
   receiving, at a computer system of an institute issuing payment cards and from a seller of goods or services, a request for a transaction, wherein the request for the transaction identifies a payment card of a user associated with a mobile telephony terminal, and wherein the request for the transaction comprises a request to verify that the user associated with the mobile telephony terminal is registered for a data security service;
   in response to receiving, by the computer system of the institute issuing payment cards, the request for the transaction, determining, by the computer system of the institute issuing payment cards and based on a database of registered user profiles, the user associated with the mobile telephony terminal is registered for the data security service;
   in response to determining, by the computer system of the institute issuing payment cards, that the user associated with the mobile telephony terminal is registered for the data security service, transmitting, by the computer system of the institute issuing payment cards and to a computer system of a mobile telephony network, a request for the computer system of the mobile telephony network to confirm the transaction;
   in response to the request to confirm the transaction transmitted by the computer system of the institute issuing payment cards, determining, by the computer system of the mobile telephony network, based on a second database of registered user profiles, and based on a status of the mobile telephony terminal, the user associated with the mobile telephony terminal is registered for the data security service;
   in response to determining, by the computer system of the mobile telephony network, that the user associated with the mobile telephony terminal is registered for the data security service, transmitting, by the computer system of the mobile telephony network and to the mobile telephony terminal associated with the user, an instruction for the mobile telephony terminal to activate software for requesting confirmation of the transaction;

receiving, at the computer system of the mobile telephony network and from the mobile telephony terminal, a response indicating confirmation of the transaction; and in response to receiving, from the mobile telephony terminal, the response indicating confirmation of the transaction, granting, by the computer system of the institute issuing payment cards, the requested transaction, wherein one or more of the instruction to the mobile telephony terminal requesting confirmation of the transaction or the response indicating confirmation of the transaction is sent over a data channel connecting the computer system of the mobile telephony network to the mobile telephony terminal.

2. The method of claim 1, further comprising:
transmitting, by the user and to a data processing system of the seller, one or more of information identifying the payment card or a number of the mobile telephony terminal.

3. The method of claim 1, further comprising:
in response to receiving the response indicating confirmation of the transaction, forwarding the confirmation of the transaction to the computer system of the institute issuing payment cards.

4. The method of claim 1, wherein the data channel connecting the computer system of the mobile telephony network to the mobile telephony terminal uses one or more of the following: an SMS message, a WAP protocol, an HTTP protocol, or an HTTPS protocol.

5. The method of claim 4, wherein the instruction to the mobile telephony terminal requesting confirmation of the transaction comprises a push mode message.

6. The method of claim 1, wherein the instruction to the mobile telephony terminal requesting confirmation of the transaction comprises a first short message service (SMS) message, and wherein the response from the mobile telephony terminal indicating confirmation of the transaction comprises a second SMS message.

7. The method of claim 1, wherein the software is configured to be installed on a Subscriber Identity Module (SIM) of the mobile telephony terminal associated with the user, the method further comprising:
transmitting, by the computer system of the mobile telephony network and to the mobile telephony terminal, the software, wherein the software is configured to enable the mobile telephony terminal to display, on a display screen of the mobile telephony terminal, a request to confirm the transaction and to transmit the response indicating confirmation of the transaction.

8. A system comprising:
a computing device of a mobile telephony network; and
a computing device of an institute issuing payment cards configured to:
receive, from a seller of goods or services, a request for a transaction, wherein the request for the transaction identifies a payment card of a user associated with a mobile telephony terminal, and wherein the request for the transaction comprises a request to verify that the user associated with the mobile telephony terminal is registered for a data security service;
in response to receiving the request for the transaction, determine, based on a database of registered user profiles, whether the user associated with the mobile telephony terminal is registered for the data security service; and
in response to determining that the user associated with the mobile telephony terminal is registered for the data security service, transmit, to the computing device of the mobile telephone network, a request for the computing device of the mobile telephony network to confirm the transaction,
wherein the computing device of the mobile telephony network is configured to:
in response to the request to confirm the transaction transmitted by the computing device of the institute issuing payment cards, determine, based on a second database of registered user profiles and based on a status of the mobile telephony terminal, whether the user associated with the mobile telephony terminal is registered for the data security service;
in response to determining that the user associated with the mobile telephony terminal is registered for the data security service, transmit, to the mobile telephony terminal associated with the user, an instruction for the mobile telephony terminal to activate software for requesting confirmation of the transaction;
receive, from the mobile telephony terminal, a response indicating confirmation of the transaction; and
in response to receiving, from the mobile telephony terminal, the response indicating confirmation of the transaction, transmit, to the computing device of the institute issuing payment cards, a message indicating that the requested transaction has been confirmed,
wherein one or more of the instruction to the mobile telephony terminal requesting confirmation of the transaction or the response indicating confirmation of the transaction is sent over a data channel connecting the computing device of the mobile telephony network to the mobile telephony terminal.

9. The system of claim 8, wherein the computing device of the institute issuing payment cards is further configured to:
transmit, to the computing device of the mobile telephony network, one or more of information identifying the payment card or a number of the mobile telephony terminal.

10. The system of claim 8, wherein the computing device of the institute issuing payment cards is configured to:
grant the requested transaction in response to the computing device of the institute issuing payment cards receiving, from the computing device of the mobile telephony network, the message indicating that the requested transaction has been confirmed.

11. The system of claim 8, wherein the data channel connecting the computing device of the mobile telephony network to the mobile telephony terminal uses one or more of the following: an SMS message, a WAP protocol, an HTTP protocol, or an HTTPS protocol.

12. The system of claim 11, wherein the instruction to the mobile telephony terminal requesting confirmation of the transaction comprises a push mode message.

13. The system of claim 8, wherein the instruction to the mobile telephony terminal requesting confirmation of the transaction comprises a first short message service (SMS) message, and wherein the response from the mobile telephony terminal indicating confirmation of the transaction comprises a second SMS message.

14. The system of claim 8, wherein the software is configured to be installed on a Subscriber Identity Module (SIM) of the mobile telephony terminal associated with the user, wherein the computing device of the mobile telephony network is further configured to:

transmit, to the mobile telephony terminal, the software, wherein the software is configured to enable the mobile telephony terminal to display, on a display screen of the mobile telephony terminal, a request to confirm the transaction and to transmit the response indicating confirmation of the transaction.

\* \* \* \* \*